US011754268B2

(12) United States Patent
Raposo et al.

(10) Patent No.: US 11,754,268 B2
(45) Date of Patent: *Sep. 12, 2023

(54) UNDERWATER LIGHT HAVING PROGRAMMABLE CONTROLLER AND REPLACEABLE LIGHT-EMITTING DIODE (LED) ASSEMBLY

(71) Applicant: Hayward Industries, Inc., Berkeley Heights, NJ (US)

(72) Inventors: Danny Raposo, Lincoln, RI (US); James Carter, Warren, RI (US); Steven Mitchell, Chepachet, RI (US); Jeffrey Cho, Northborough, MA (US); Yevgeny Rapoport, Mystic, CT (US); Joseph A. Gundel, Warwick, RI (US)

(73) Assignee: Hayward Industries, Inc., Berkeley Heights, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/522,700

(22) Filed: Nov. 9, 2021

(65) Prior Publication Data

US 2022/0065432 A1 Mar. 3, 2022

Related U.S. Application Data

(63) Continuation of application No. 16/812,037, filed on Mar. 6, 2020, now Pat. No. 11,168,876.
(Continued)

(51) Int. Cl.
*F21V 23/00* (2015.01)
*F21V 23/06* (2006.01)
(Continued)

(52) U.S. Cl.
CPC .......... *F21V 23/005* (2013.01); *F21V 23/006* (2013.01); *F21V 23/06* (2013.01);
(Continued)

(58) Field of Classification Search
None
See application file for complete search history.

(56) References Cited

U.S. PATENT DOCUMENTS 1,874,513 A  8/1932 Hall
1,991,775 A  2/1935 Spencer
(Continued)

FOREIGN PATENT DOCUMENTS

CN  2705700 Y  6/2005
CN  1664439 A  9/2005
(Continued)

OTHER PUBLICATIONS

International Search Report and Written Opinion of the International Searching Authority dated Jun. 12, 2008, issued n connection with International Patent App. No PCT/US07/85793 (8 pages).
(Continued)

*Primary Examiner* — Anh Q Tran
(74) *Attorney, Agent, or Firm* — McCarter & English, LLP

(57) ABSTRACT

An underwater light including a programmable controller and a replaceable light-emitting diode (LED) printed circuit board assembly (PCBA) is provided. The light includes a controller PCBA in communication with the LED PCBA, and a connector for connecting the controller PCBA to the LED PCBA. An optically-transparent potting compound encapsulates the LED PCBA, and the LED PCBA can be safely replaced by removing a rear housing of the underwater light.

20 Claims, 13 Drawing Sheets

Related U.S. Application Data

(60) Provisional application No. 62/814,763, filed on Mar. 6, 2019.

(51) Int. Cl.
*F21V 31/04* (2006.01)
*H05B 45/28* (2020.01)
*H05B 45/325* (2020.01)
*H05B 45/3725* (2020.01)
*H05B 45/395* (2020.01)
*H05B 45/56* (2020.01)
*H05B 45/54* (2020.01)
*H05B 45/355* (2020.01)
*F21Y 115/10* (2016.01)

(52) U.S. Cl.
CPC ............. *F21V 31/04* (2013.01); *H05B 45/28* (2020.01); *H05B 45/325* (2020.01); *H05B 45/355* (2020.01); *H05B 45/3725* (2020.01); *H05B 45/395* (2020.01); *H05B 45/54* (2020.01); *H05B 45/56* (2020.01); *F21Y 2115/10* (2016.08)

(56) References Cited

U.S. PATENT DOCUMENTS

| | | |
|---|---|---|
| 2,057,186 A | 10/1936 | Freeberg |
| 2,323,793 A | 7/1943 | Clark |
| 2,355,607 A | 8/1944 | Shepherd |
| 2,881,409 A | 4/1959 | Cook |
| 2,903,674 A | 9/1959 | Schwab |
| 3,020,522 A | 2/1962 | Lesher |
| 3,114,127 A | 12/1963 | Ramsey |
| 3,213,377 A | 10/1965 | Neale |
| 3,255,433 A | 6/1966 | Lesher |
| 3,257,641 A | 6/1966 | Campana et al. |
| 3,271,734 A | 9/1966 | Cabe et al. |
| 3,435,213 A | 3/1969 | Colbow et al. |
| 3,594,720 A | 7/1971 | Cane |
| 3,804,049 A | 4/1974 | Greer |
| 4,053,758 A | 10/1977 | Shaw |
| 4,054,792 A | 10/1977 | Brudy |
| 4,135,144 A | 1/1979 | Elmasian |
| 4,298,868 A | 11/1981 | Spurgeon |
| 4,392,187 A | 7/1983 | Bornhorst |
| 4,636,036 A | 1/1987 | Pasquali |
| 4,729,076 A | 3/1988 | Masami et al. |
| 4,814,800 A | 3/1989 | Lavinsky et al. |
| 4,890,208 A | 12/1989 | Izenour |
| 4,974,133 A | 11/1990 | Fujiki |
| 5,045,983 A | 9/1991 | Shields |
| 5,220,464 A | 6/1993 | Lin |
| 5,256,948 A | 10/1993 | Boldin et al. |
| 5,295,054 A | 3/1994 | Baader et al. |
| 5,528,474 A | 6/1996 | Roney et al. |
| 5,632,551 A | 5/1997 | Roney et al. |
| 5,649,242 A | 7/1997 | O'Brien et al. |
| 5,785,418 A | 7/1998 | Hochstein |
| 5,842,771 A | 12/1998 | Thrasher et al. |
| 5,893,626 A | 4/1999 | Poling |
| 6,002,216 A | 12/1999 | Mateescu |
| 6,016,038 A | 1/2000 | Mueller et al. |
| 6,045,240 A | 4/2000 | Hochstein |
| 6,081,191 A | 6/2000 | Green et al. |
| RE36,790 E | 7/2000 | Jincks et al. |
| 6,090,484 A | 7/2000 | Bergerson |
| 6,100,791 A | 8/2000 | Bader et al. |
| 6,152,577 A | 11/2000 | Rizkin et al. |
| 6,166,496 A | 12/2000 | Lys et al. |
| 6,175,354 B1 | 1/2001 | Blissett et al. |
| 6,184,628 B1 | 2/2001 | Ruthenberg |
| 6,196,471 B1 | 3/2001 | Ruthenberg |
| 6,211,626 B1 | 4/2001 | Lys et al. |
| 6,241,361 B1 | 6/2001 | Thrasher et al. |
| 6,241,362 B1 | 6/2001 | Morrison |
| 6,292,901 B1 | 9/2001 | Lys et al. |
| 6,357,889 B1 | 3/2002 | Duggal et al. |
| 6,367,541 B2 | 4/2002 | McCullough |
| 6,379,025 B1 | 4/2002 | Mateescu et al. |
| 6,435,691 B1 | 8/2002 | Macey et al. |
| 6,441,943 B1 | 8/2002 | Roberts et al. |
| 6,459,919 B1 | 10/2002 | Lys et al. |
| 6,528,954 B1 | 3/2003 | Lys et al. |
| 6,548,967 B1 | 4/2003 | Dowling et al. |
| 6,554,454 B1 | 4/2003 | Kitano |
| 6,585,399 B2 | 7/2003 | Kreutzer et al. |
| 6,608,453 B2 | 8/2003 | Morgan et al. |
| 6,616,291 B1 | 9/2003 | Love |
| 6,622,053 B1 | 9/2003 | Hewlett et al. |
| 6,624,597 B2 | 9/2003 | Dowling et al. |
| 6,717,376 B2 | 4/2004 | Lys et al. |
| 6,720,745 B2 | 4/2004 | Lys et al. |
| 6,774,584 B2 | 8/2004 | Lys et al. |
| 6,777,891 B2 | 8/2004 | Lys et al. |
| 6,781,329 B2 | 8/2004 | Mueller et al. |
| 6,798,154 B1 | 9/2004 | Sullivan et al. |
| 6,801,003 B2 | 10/2004 | Schanberger et al. |
| 6,811,286 B2 | 11/2004 | Mateescu et al. |
| 6,831,679 B1 | 12/2004 | Olsson et al. |
| 6,869,204 B2 | 3/2005 | Morgan et al. |
| 6,883,929 B2 | 4/2005 | Dowling |
| 6,886,625 B1 | 5/2005 | Sagal et al. |
| 6,888,322 B2 | 5/2005 | Dowling et al. |
| 6,896,045 B2 | 5/2005 | Panek |
| 6,897,624 B2 | 5/2005 | Lys et al. |
| 6,936,978 B2 | 8/2005 | Morgan et al. |
| 6,965,205 B2 | 11/2005 | Piepgras et al. |
| 6,967,448 B2 | 11/2005 | Morgan et al. |
| 6,969,954 B2 | 11/2005 | Lys |
| 6,971,760 B2 | 12/2005 | Archer et al. |
| 6,975,079 B2 | 12/2005 | Lys et al. |
| 6,981,805 B2 | 1/2006 | Miller et al. |
| 7,023,147 B2 | 4/2006 | Colby et al. |
| 7,031,920 B2 | 4/2006 | Dowling et al. |
| 7,038,398 B1 | 5/2006 | Lys et al. |
| 7,038,399 B2 | 5/2006 | Lys et al. |
| 7,055,988 B2 | 6/2006 | Mateescu et al. |
| 7,064,498 B2 | 6/2006 | Dowling et al. |
| 7,097,329 B2 | 8/2006 | Mateescu et al. |
| 7,113,541 B1 | 9/2006 | Lys et al. |
| 7,125,146 B2 | 10/2006 | Willis et al. |
| 7,128,440 B2 | 10/2006 | Mateescu et al. |
| 7,132,635 B2 | 11/2006 | Dowling |
| 7,132,785 B2 | 11/2006 | Ducharme |
| 7,135,824 B2 | 11/2006 | Lys et al. |
| 7,139,617 B1 | 11/2006 | Morgan et al. |
| 7,161,311 B2 | 1/2007 | Mueller et al. |
| 7,161,556 B2 | 1/2007 | Morgan et al. |
| 7,178,941 B2 | 2/2007 | Roberge et al. |
| 7,180,252 B2 | 2/2007 | Lys et al. |
| 7,186,003 B2 | 3/2007 | Dowling et al. |
| 7,202,613 B2 | 4/2007 | Morgan et al. |
| 7,204,602 B2 | 4/2007 | Archer |
| 7,204,622 B2 | 4/2007 | Dowling et al. |
| 7,228,190 B2 | 6/2007 | Dowling et al. |
| 7,231,060 B2 | 6/2007 | Dowling et al. |
| 7,233,115 B2 | 6/2007 | Lys |
| 7,233,831 B2 | 6/2007 | Blackwell |
| 7,242,152 B2 | 7/2007 | Dowling et al. |
| 7,248,239 B2 | 7/2007 | Dowling et al. |
| 7,253,566 B2 | 8/2007 | Lys et al. |
| 7,255,457 B2 | 8/2007 | Ducharme et al. |
| 7,256,554 B2 | 8/2007 | Lys |
| 7,278,762 B2 | 10/2007 | Schottland et al. |
| 7,300,192 B2 | 11/2007 | Mueller et al. |
| 7,303,300 B2 | 12/2007 | Dowling et al. |
| 7,303,301 B2 | 12/2007 | Koren et al. |
| 7,344,279 B2 | 3/2008 | Mueller et al. |
| 7,352,339 B2 | 4/2008 | Morgan et al. |
| 7,353,071 B2 | 4/2008 | Blackwell et al. |
| 7,357,525 B2 | 4/2008 | Doyle |
| 7,358,679 B2 | 4/2008 | Lys et al. |
| 7,358,706 B2 | 4/2008 | Lys |

(56) References Cited

U.S. PATENT DOCUMENTS

| | | |
|---|---|---|
| 7,358,929 B2 | 4/2008 | Mueller et al. |
| 7,364,488 B2 | 4/2008 | Mueller et al. |
| 7,396,139 B2 | 7/2008 | Savage |
| 7,410,268 B2 | 8/2008 | Koren et al. |
| 7,482,764 B2 | 1/2009 | Morgan et al. |
| 7,488,084 B2 | 2/2009 | Potucek et al. |
| 7,497,595 B2 | 3/2009 | Mateescu et al. |
| 7,514,884 B2 | 4/2009 | Potucek et al. |
| 7,520,628 B1 | 4/2009 | Sloan et al. |
| 7,524,086 B1 | 4/2009 | Saieva |
| 7,553,040 B2 | 6/2009 | Boothe et al. |
| 7,591,564 B1 | 9/2009 | Ball et al. |
| 7,628,512 B2 | 12/2009 | Netzel, Sr. et al. |
| 7,705,240 B2 | 4/2010 | Armstrong et al. |
| 7,722,216 B2 | 5/2010 | Amor et al. |
| 7,914,162 B1 | 3/2011 | Huang |
| 8,172,434 B1 | 5/2012 | Olsson |
| RE43,492 E | 6/2012 | Willis et al. |
| 9,316,387 B1 | 4/2016 | Olsson et al. |
| 10,718,507 B2 | 7/2020 | Potucek et al. |
| 11,168,876 B2 * | 11/2021 | Raposo .................. H05B 45/54 |
| 2002/0043938 A1 | 4/2002 | Lys |
| 2002/0074559 A1 | 6/2002 | Dowling et al. |
| 2002/0113555 A1 | 8/2002 | Lys et al. |
| 2002/0130627 A1 | 9/2002 | Morgan et al. |
| 2002/0149933 A1 | 10/2002 | Archer et al. |
| 2002/0152045 A1 | 10/2002 | Dowling et al. |
| 2002/0163316 A1 | 11/2002 | Lys et al. |
| 2002/0171377 A1 | 11/2002 | Mueller et al. |
| 2002/0176259 A1 | 11/2002 | Ducharme |
| 2003/0048632 A1 | 3/2003 | Archer |
| 2003/0057884 A1 | 3/2003 | Dowling et al. |
| 2003/0133292 A1 | 7/2003 | Mueller et al. |
| 2004/0047145 A1 | 3/2004 | Koren |
| 2004/0052076 A1 | 3/2004 | Mueller et al. |
| 2004/0085754 A1 | 5/2004 | Koren et al. |
| 2004/0105261 A1 | 6/2004 | Ducharme et al. |
| 2004/0141321 A1 | 7/2004 | Dowling et al. |
| 2004/0184284 A1 | 9/2004 | Buelow et al. |
| 2004/0208008 A1 | 10/2004 | Mateescu et al. |
| 2004/0223320 A1 | 11/2004 | Archer et al. |
| 2004/0252520 A1 | 12/2004 | Martineau et al. |
| 2005/0040774 A1 | 2/2005 | Mueller et al. |
| 2005/0041161 A1 | 2/2005 | Dowling et al. |
| 2005/0047134 A1 | 3/2005 | Mueller et al. |
| 2005/0047772 A1 | 3/2005 | Hayami et al. |
| 2005/0088119 A1 | 4/2005 | Potucek et al. |
| 2005/0088434 A1 | 4/2005 | Potucek |
| 2005/0099824 A1 | 5/2005 | Dowling et al. |
| 2005/0116665 A1 | 6/2005 | Colby et al. |
| 2005/0128751 A1 | 6/2005 | Roberge et al. |
| 2005/0168970 A1 | 8/2005 | Mateescu et al. |
| 2005/0174473 A1 | 8/2005 | Morgan et al. |
| 2005/0213352 A1 | 9/2005 | Lys |
| 2005/0213353 A1 | 9/2005 | Lys |
| 2005/0218870 A1 | 10/2005 | Lys |
| 2005/0248299 A1 | 11/2005 | Chemel et al. |
| 2005/0276044 A1 | 12/2005 | Mateescu et al. |
| 2006/0002104 A1 | 1/2006 | Willis et al. |
| 2006/0012987 A9 | 1/2006 | Ducharme et al. |
| 2006/0022214 A1 | 2/2006 | Morgan et al. |
| 2006/0023454 A1 | 2/2006 | Koren |
| 2006/0072323 A1 | 4/2006 | Poggi |
| 2006/0076908 A1 | 4/2006 | Morgan et al. |
| 2006/0087850 A1 | 4/2006 | Thompson et al. |
| 2006/0092636 A1 | 5/2006 | Potucek et al. |
| 2006/0198128 A1 | 9/2006 | Piepgras et al. |
| 2006/0215408 A1 | 9/2006 | Lee |
| 2006/0238130 A1 | 10/2006 | Hosoya |
| 2006/0291213 A1 | 12/2006 | Mateescu et al. |
| 2007/0096134 A1 | 5/2007 | Kim et al. |
| 2007/0097667 A1 | 5/2007 | Armstrong et al. |
| 2007/0097675 A1 | 5/2007 | Koren et al. |
| 2007/0139913 A1 | 6/2007 | Savage |
| 2007/0159833 A1 | 7/2007 | Netzel et al. |
| 2007/0230194 A1 | 10/2007 | Julia Vilarrasa |
| 2007/0263378 A1 | 11/2007 | Koren |
| 2008/0112157 A1 | 5/2008 | Boothe et al. |
| 2008/0165547 A1 | 7/2008 | Amor et al. |
| 2008/0197788 A1 * | 8/2008 | Conover .............. H05B 47/155 315/291 |
| 2008/0297068 A1 | 12/2008 | Koren et al. |
| 2009/0013570 A1 | 1/2009 | Grajcar |
| 2009/0109617 A1 | 4/2009 | Grajcar |
| 2009/0180281 A1 | 7/2009 | Ahland, III et al. |
| 2009/0180290 A1 | 7/2009 | Grajcar |
| 2009/0185350 A1 | 7/2009 | Grajcar |
| 2009/0185373 A1 | 7/2009 | Grajcar |
| 2009/0204239 A1 | 8/2009 | Netzel, Sr. et al. |
| 2010/0118511 A1 | 5/2010 | Wegat |
| 2010/0157599 A1 | 6/2010 | Carter et al. |
| 2011/0096548 A1 | 4/2011 | Pickard |
| 2011/0267834 A1 | 11/2011 | Potucek et al. |
| 2013/0182442 A1 | 7/2013 | Potucek et al. |
| 2013/0249375 A1 | 9/2013 | Panagotacos et al. |
| 2013/0264943 A1 * | 10/2013 | Bora ...................... H05B 47/11 315/153 |
| 2015/0184837 A1 | 7/2015 | Zhang et al. |
| 2017/0122544 A1 | 5/2017 | Schmitt |
| 2017/0261196 A1 | 9/2017 | Chapman et al. |
| 2017/0299159 A1 | 10/2017 | Mjelde |
| 2017/0343185 A1 * | 11/2017 | Fieberg ................. F21V 5/045 |

FOREIGN PATENT DOCUMENTS

| | | |
|---|---|---|
| CN | 101010234 A | 8/2007 |
| DE | 10321992 A1 | 3/2005 |
| DE | 102008056498 A1 | 5/2010 |
| EP | 1016062 A1 | 7/2000 |
| GB | 2 239 306 A | 6/1991 |
| WO | 99/31560 A2 | 6/1999 |
| WO | 00/01067 A2 | 1/2000 |
| WO | 01/05195 A1 | 1/2001 |
| WO | 01/24584 A1 | 4/2001 |
| WO | 01/36864 A2 | 5/2001 |
| WO | 01/82657 A1 | 11/2001 |
| WO | 01/99475 A1 | 12/2001 |
| WO | 02/10847 A2 | 2/2002 |
| WO | 02/11497 A1 | 2/2002 |
| WO | 02/12127 A2 | 2/2002 |
| WO | 02/13490 A2 | 2/2002 |
| WO | 02/18913 A2 | 3/2002 |
| WO | 02/25842 A2 | 3/2002 |
| WO | 02/040921 A2 | 5/2002 |
| WO | 02/045467 A2 | 6/2002 |
| WO | 02/061330 A2 | 8/2002 |
| WO | 02/069306 A2 | 9/2002 |
| WO | 02/091805 A2 | 11/2002 |
| WO | 02/098182 A2 | 12/2002 |
| WO | 02/098183 A1 | 12/2002 |
| WO | 02/099780 A2 | 12/2002 |
| WO | 02/101702 A2 | 12/2002 |
| WO | 03/024269 A1 | 3/2003 |
| WO | 03/026358 A1 | 3/2003 |
| WO | 03/055273 A2 | 7/2003 |
| WO | 03/067934 A2 | 8/2003 |
| WO | 03/096761 A1 | 11/2003 |
| WO | 2004/021747 A2 | 3/2004 |
| WO | 2004/023850 A2 | 3/2004 |
| WO | 2004/032572 A2 | 4/2004 |
| WO | 2004/094896 A2 | 11/2004 |
| WO | 2004/100624 A2 | 11/2004 |
| WO | 2005/012997 A2 | 2/2005 |
| WO | 2005/060309 A2 | 6/2005 |
| WO | 2005/084339 A2 | 9/2005 |
| WO | 2005/089293 A2 | 9/2005 |
| WO | 2005/089309 A2 | 9/2005 |
| WO | 2006/023149 A2 | 3/2006 |
| WO | 2006/031753 A2 | 3/2006 |
| WO | 2006/031810 A2 | 3/2006 |

(56) References Cited

FOREIGN PATENT DOCUMENTS

| WO | 2008/067402 A2 | 6/2008 |
|---|---|---|
| WO | 2010/032062 A1 | 3/2010 |

OTHER PUBLICATIONS

Extended European Search Report dated Aug. 22, 2011, issued in connection with European Patent Application No. 11164216.1 (7 pages).
Third Party Observations dated Apr. 11, 2015, submitted in connection with European Patent Application No. 11164216.1 (2 pages).
European Office Action dated Nov. 3, 2015, issued in connection with European Patent Application No. 11164216.1 (9 pages).
European Office Action dated Nov. 18, 2016, issued in connection with European Patent Application No. 11164216.1 (6 pages).
Communication (Notice of Intention to Grant) mailed Oct. 31, 2017, issued in connection with European Patent Application No. 11164216.1 (5 pages).
Patent Examination Report dated Mar. 18, 2014, issued in connection with Australian Patent Application No. 2011201916 (4 pages).
Patent Examination Report dated May 13, 2015, issued in connection with Australian Patent Application No. 2011201916 (4 pages).
Patent Examination Report dated Dec. 3, 2015, issued in connection with Australian Patent Application No. 2011201916 (4 pages).
Patent Examination Report dated Jul. 19, 2016, issued in connection with Australian Patent Application No. 2015271887 (3 pages).
Examination Report dated Feb. 20, 2017, issued in connection with Canadian Patent Application No. 2,738,255 (7 pages).
English Translation of the First Office Action dated Jul. 31, 2014, issued in connection with Chinese Patent Application No. 201110152483.3 (11 pages).
English Translation of the Second Office Action dated May 21, 2015, issued in connection with Chinese Patent Application No. 201110152483 3 (4 pages).
Office Action (Restriction Requirement) dated May 9, 2011, issued in connection with U.S. Appl. No. 12/769,038 (9 pages).
Office Action dated Sep. 6, 2011, issued in connection with U.S. Appl. No. 12/769,038 (11 pages).
Office Action dated May 9, 2012, issued in connection with U.S. Appl. No. 12/769,038 (11 pages).
Office Action dated Dec. 3, 2013, issued in connection with U.S. Appl. No. 12/769,038 (10 pages).
Office Action dated Aug. 20, 2014, issued in connection with U.S. Appl. No. 12/769,038 (11 pages).
Office Action dated Apr. 2, 2015, issued in connection with U.S. Appl. No. 12/769,038 (15 pages).
Office Action dated Dec. 30, 2015, issued in connection with U.S. Appl. No. 12/769,038 (13 pages).
Office Action dated Nov. 17, 2016, issued in connection with U.S. Appl. No. 12/769,038 (13 pages).
Office Action dated Aug. 25, 2017, issued in connection with U.S. Appl. No. 12/769,038 (15 pages).
Examiner's Answer to Appeal Brief dated Nov. 27, 2018, issued in connection with U.S. Appl. No. 12/769,038 (10 pages).
Decision on Appeal dated Jan. 30, 2020, issued by the Patent Trial and Appeal Board in connection with U.S. Appl. No. 12/769,038 (14 pages).
Office Action dated Dec. 4, 2013, issued in connection with U.S. Appl. No. 13/786,739 (11 pages).
Office Action dated Aug. 20, 2014, issued in connection with U.S. Appl. No. 13/786,739 (15 pages).
Office Action dated Apr. 1, 2015, issued in connection with U.S. Appl. No. 13/786,739 (20 pages).
Office Action dated Jan. 6, 2016, issued in connection with U.S. Appl. No. 13/786,739 (19 pages).
Office Action dated Nov. 22, 2016, issued in connection with U.S. Appl. No. 13/786,739 (21 pages).
Office Action dated Aug. 15, 2017, issued in connection with U.S. Appl. No. 13/786,739 (23 pages).
Examiner's Answer to Appeal Brief dated Dec. 10, 2018, issued in connection with U.S. Appl. No. 13/786,739 (12 pages).
Supplemental Examiner's Answer to Appeal Brief, dated Jan. 16, 2019, issued in connection with U.S. Appl. No. 13/786,739 (2 pages).
Decision on Appeal dated Dec. 12, 2019, issued by the Patent Trial and Appeal Board in connection with U.S. Appl. No. 13/786,739 (12 pages).
Notice of Allowance dated Mar. 9, 2020, issued in connection with U.S. Appl. No. 13/786,739 (7 pages).
Supplemental Notice of Allowability dated Mar. 25, 2020, issued in connection with U.S. Appl. No. 13/786,739 (4 pages).
International Search Report and Written Opinion of the International Searching Authority dated Jun. 19, 2020, issued n connection with International App. No. PCT/US2020/021536 (7 pages).
Office Action dated Oct. 21, 2020, issued in connection with U.S. Appl. No. 16/812,037 (11 pages).
Notice of Allowance dated Mar. 16, 2021, issued in connection with U.S. Appl. No. 16/812,037 (10 pages).
Notice of Allowance dated Jun. 22, 2021, issued in connection with U.S. Appl. No. 16/812,037 (6 pages).
U.S. Appl. No. 60/068,792 entitled "Multi-Color Intelligent Lighting" filed Dec. 24, 1997, Inventors: George G. Mueller and Ihor Lys (2 pages).
U.S. Appl. No. 60/071,281 entitled "Digitally Controlled Light Emitting Diode Systems and Methods" filed Dec. 17, 1997, Inventors: George G. Mueller and Ihor A. Lys (24 pages).
U.S. Appl. No. 60/078,861 entitled "Digital Lighting Systems" filed Mar. 20, 1998, Inventors: Ihor Lys (2 pages).
U.S. Appl. No. 60/079,285 entitled "Systems and Methods for Controlled Tlumination" filed Mar. 25, 1998, Inventors: George G. Mueller and Ihor Lys (34 pages).
U.S. Appl. No. 60/090,920 entitled "Method for Software Driven Generation of Multiple Simultaneous High Speed Pulse Width Modulated Signals" filed Jun. 26, 1998, Inventors: Ihor Lys (8 pages).
U.S. Appl. No. 60/199,333 entitled "Autonomous Color Changing Accessory" filed Apr. 24, 2000, Inventors: Al Ducharme, Ihor Lys and Kevin Dowling (19 pages).
U.S. Appl. No. 60/243,250 entitled "Illumination of Liquids" filed Oct. 25, 2000, Inventors: Frederick Morgan, Timothy Holmes, Chris Cantone, Ihor Lys and George Mueller (24 pages).
U.S. Appl. No. 60/290,101 entitled "Systems and Methods for Synchronizing Tlumination Systems" filed May 10, 2001, Inventors: Kevin Dowling and Eric K. Schanberger (27 pages).
U.S. Appl. No. 60/296,377 entitled "Systems and Methods for Controlling Lighting Systems" filed Jun. 6, 2001, Inventors: Mike Blackwell (11 pages).
U.S. Appl. No. 60/297,828 entitled "Systems and Methods for Controlling Lighting Systems" filed Jun. 13, 2001, Inventors: George Mueller, Frederick Morgan, Ihor Lys and Kevin Dowling (13 pages).
U.S. Appl. No. 60/515,090 entitled "Color Changing Image with Backlighting and Combination Localized Gray-Scale and Color Image" filed Oct. 28, 2003, Inventors: Kevin Potucek and Kevin Murphy (13 pages).
Bond-Ply 100—"Thermally Conductive, Fiberglass Reinfomced Pressure Sensitive Adhesive Tape," The Bergquist Company, http://www.bergquistcompany.com, publicly available prior to Dec. 24, 2008 (3 pages).
CoolPoly® D5108 Thermally Conductive Polyphenylene Sulfide (PPS), Product Data Sheet dated Aug. 8, 2007 (2 pages).
IntelliBrite™ Underwater Color-Changing Lights (2007) (4 pages).
Underwater ColorLogic™ LED Lighting Fixtures SP0525(S) Owner's Manual (2004) (12 pages).
Underwater ColorLogic™ LED Lighting Fixtures SP0523(S) Owner's Manual (2004) (12 pages).
Underwater ColorLogic™ LED Lighting Fixtures SP0524(S), SP0525(S), SP0527(S), SP0532(S), SP0533(S) and SP0535(S) Owner's Manual (2004) (12 pages).
Sta-Rite Large Underwater Light Niche Owner's Manual (2004) (8 pages).

(56) References Cited

OTHER PUBLICATIONS

Aqua Logic Automation and Chlorination Operation Manual (2004) (40 pages).
American/Pentair Niche w/3/4 in. Side Hub, Concrete (78210400), printed from Internet website http://www.poolplaza.com/P-PEN-78210400-2282. html (Oct. 19, 2010) (1 page).
American/Pentair Niche w/1.0 in. Hub, Vinyl/Fbgls (10 Hole) (78232500), printed from Internet website http://www.poolplaza.com/P-PEN-78210400-2282.html (Oct. 19, 2010) (1 page).
Pentair 620004 AmerLite Quick Niche, printed from Internet website http://www.aqua-man.com/row_num.asp?Ic=1892 (Oct. 19, 2010) (2 pages).
Pentair 79206700 AmerLite Large Plastic Niche, printed from Internet website http://www.aqua-man.com/row_num.asp?Ic=1895 (Oct. 19, 2010) (2 pages).
QuickNiche Vinyl Pool Lighting Niche by Pentair Water Pool and Spa, product description (2006) (2 pages).
Product Specifications for Jandy ProNiche Pool and Spa Light Niches, printed from Internet website http://www.jandy.com/html/products/lights/proniche/specs.php (Oct. 19, 2010) (2 pages).
Jandy ProNiche~Pool & Spa Light Niches, product description (2007) (2 pages).
Jandy Installation Manual Jandy Housing for Wet Niche Fixtures (2007) (8 pages).
Office Action dated Mar. 1, 2023, issued in connection with U.S. Appl. No. 17/436,514 (17 pages).

\* cited by examiner

UNDERWATER LIGHT HAVING PROGRAMMABLE CONTROLLER AND REPLACEABLE LIGHT-EMITTING DIODE (LED) ASSEMBLY

RELATED APPLICATIONS

The present application is a continuation of, and claims the benefit of priority to, U.S. patent application Ser. No. 16/812,037 filed on Mar. 6, 2020 (issued as U.S. Pat. No. 11,168,876), which claims the benefit of priority to U.S. Provisional Patent Application No. 62/814,763, filed on Mar. 6, 2019, the entire disclosures of which are all expressly incorporated by reference herein.

BACKGROUND

Technical Field

The present disclosure relates generally to the field of underwater lights for pools and spas. More specifically, the present disclosure relates to an underwater light having a programmable controller and a replaceable light-emitting diode (LED) printed circuit board assembly (PCBA).

Related Art

In the underwater lighting field, submersible luminaires are known and commonly used. These devices are conventionally made from a combination of metal, plastic, and glass. The various electrical components within a submersible luminaire housing generate heat. As a result of the foregoing, it would be desirable to provide a submersible luminaire including a programmable controller configured to optimize luminaire light shows and monitor an input voltage and temperature of the various electrical components.

In submersible luminaires, one or more light-emitting elements (e.g. light emitting diodes (LEDs)) mounted on a printed circuit board (PCB) within the submersible luminaire housing can become inoperable due to extended use or for other reasons. Conventional luminaires are hermetically sealed and, therefore, the entire luminaire must be replaced when LEDs are inoperable (e.g., when LEDs burn out). As a result of the foregoing, it would be desirable to provide a submersible luminaire with a replaceable PCB to avoid replacing a luminaire in its entirety when LEDs mounted on the PCB are inoperable.

Accordingly, the underwater light of the present disclosure addresses these and other needs.

SUMMARY

The present disclosure relates to an underwater light having a programmable controller and a replaceable light-emitting diode (LED) printed circuit board assembly (PCBA). The programmable controller includes a controller PCBA in communication with the LED PCBA, and a connector for connecting the controller PCBA to the LED PCBA. An optically-transparent potting compound encapsulates the LED PCBA, and the LED PCBA can be safely replaced by removing a rear housing of the underwater light.

BRIEF DESCRIPTION OF THE DRAWINGS

The foregoing features of the present disclosure will be apparent from the following Detailed Description of the Invention, taken in connection with the accompanying drawings, in which.

DETAILED DESCRIPTION

Figure 1:
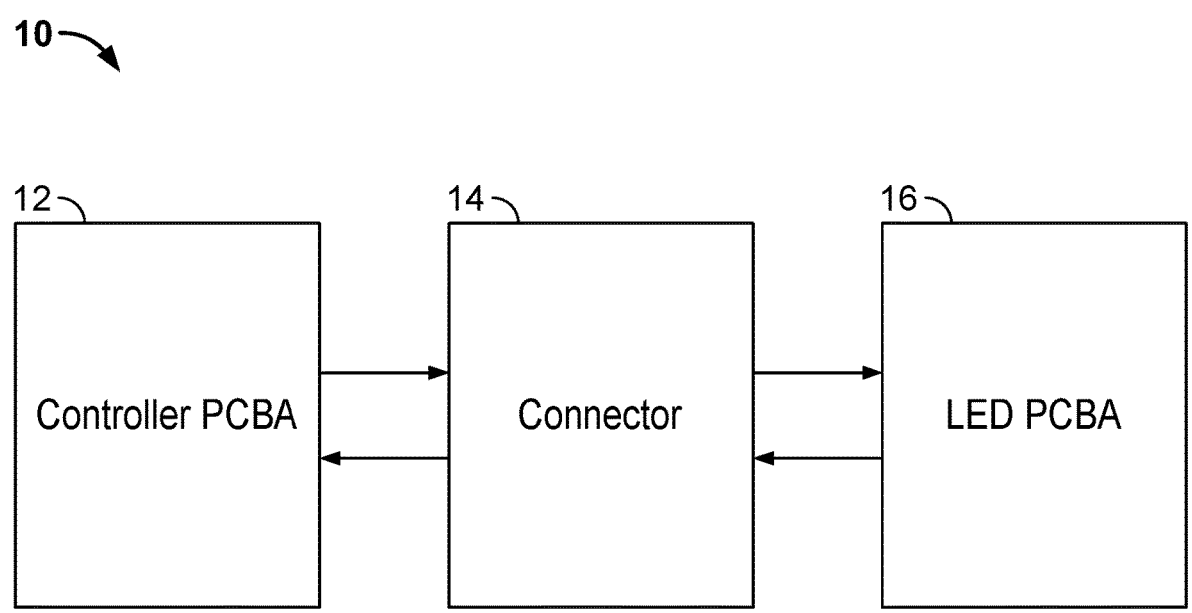
FIG. 1 is a block diagram of the underwater light of the present disclosure, illustrating connection of the controller PCBA to the LED PCBA via the connector.

The present disclosure relates to an underwater light having a programmable controller and a replaceable light-emitting diode (LED) printed circuit board assembly (PCBA), as described in detail below in connection with FIGS. 1-13.

Referring to FIGS. 1-6, the underwater light 10 of the present disclosure includes a controller PCBA 12 connected to the LED PCBA 16 via a surface mount technology (SMT) connector 14. For example, the controller PCBA 12 can connect to the LED PCBA 16 via a vertical SMT connector having a 16 pin double row configuration. The pins of the connector 14 can be gold plated and have a power rating of 405 volts alternating current (VAC) or 572 volts direct current (VDC) and a current rating of 5.2 amperes (A). The controller PCBA 12 includes a power subsystem 20, a microcontroller subsystem 22 and an LED driver subsystem 24.

The power subsystem 20 of the controller PCBA 12 powers the LED PCBA 16 with a rectified voltage. The LED driver subsystem 24 of the controller PCBA 12 connects to and drives a plurality of LED strings 74 of the LED PCBA 16. The LEDs of the LED strings 74 could include red, royal blue, green and white LEDs. In addition, the controller PCBA microcontroller subsystem 22 can control the LED PCBA 16 based on signals from at least one of a plurality of thermistors 70 (e.g., LED temperature signals), a high temperature shutdown circuit 76 (e.g., shutdown) and an electrically erasable programmable read-only memory (EEPROM) 72 (e.g., control signals) of the LED PCBA 16.

The underwater light 10 can monitor the temperature of the controller PCBA 12 and the LED PCBA 16 and prevent a temperature of the LED PCBA 16 from exceeding a temperature threshold by dimming a light output of the LED strings 74 of the LED PCBA 16. The underwater light 10 can also monitor an input voltage of the microcontroller subsystem 22 and dim the light output of the LED PCBA 16 if the input voltage falls below a temperature threshold.

Figure 2:
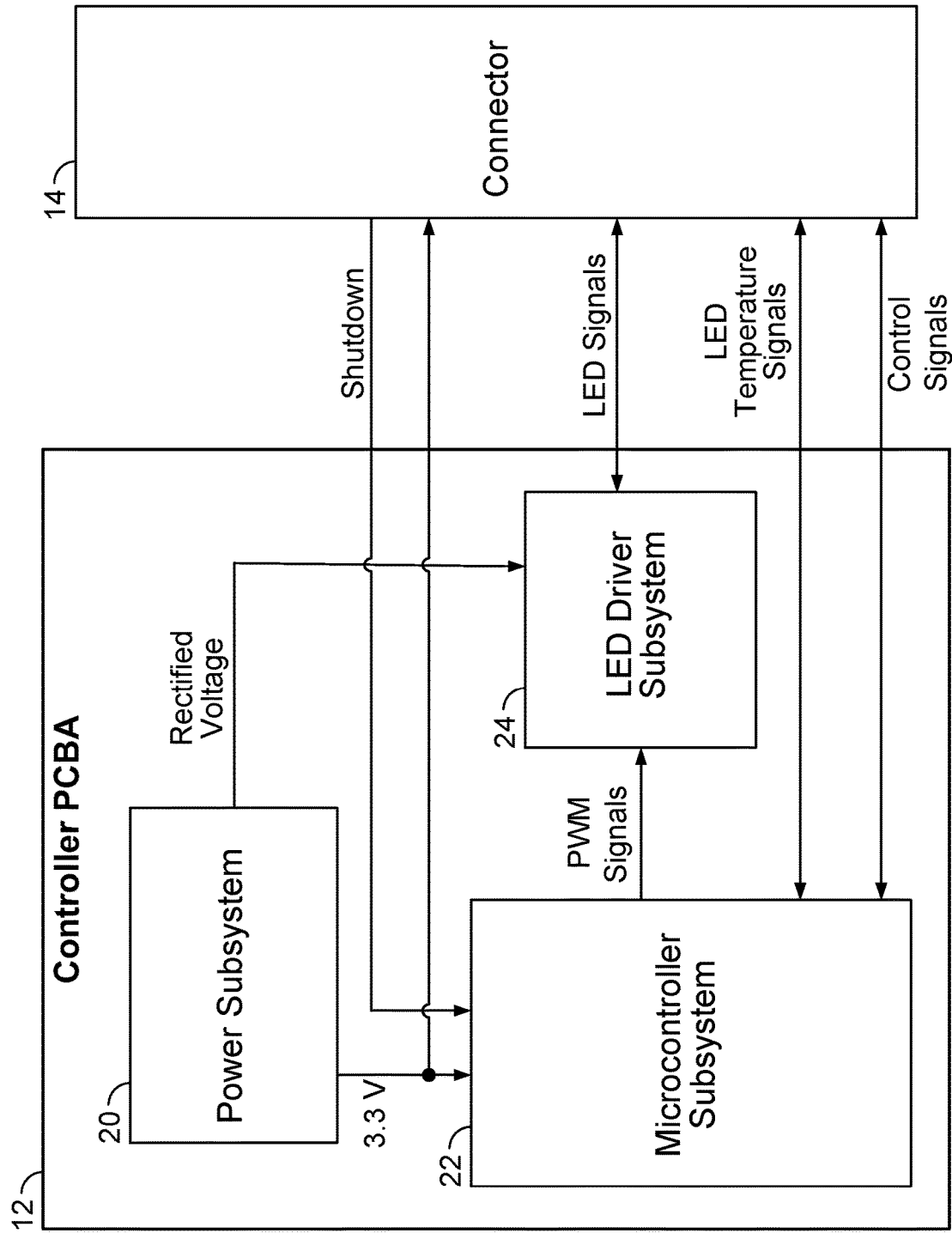
FIG. 2 is a block diagram of the controller PCBA of FIG. 1.

FIG. 2 is a block diagram of the controller PCBA 12 of FIG. 1. As mentioned above, the controller PCBA 12 includes the power subsystem 20, the microcontroller subsystem 22 and the LED driver subsystem 24. The controller PCBA 14 can connect to the LED PCBA 16 via the SMT connector 14.

Figure 3:
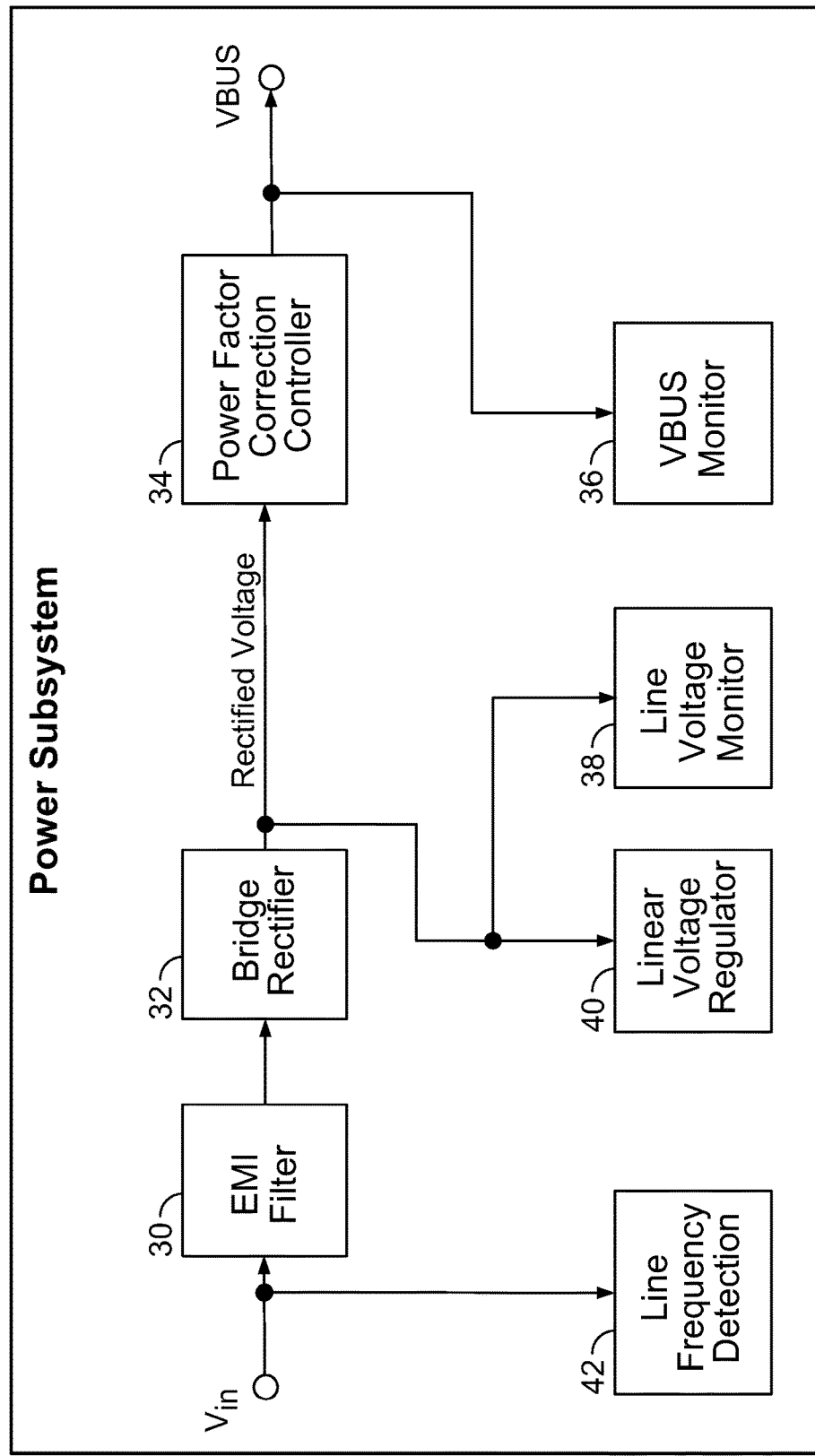
FIG. 3 is a detailed block diagram of the power subsystem of the controller PCBA of FIG. 2.

FIG. 3 is a detailed block diagram of the power subsystem 20 of the controller PCBA of FIG. 2. The power subsystem 20 includes an electromagnetic interference (EMI) filter 30; a bridge rectifier circuit 32 which produces a rectified voltage signal; a power factor correction (PFC) controller 34; a bus line (VBUS); a VBUS monitor 36; a line voltage monitor 38; a linear voltage regulator 40; and a line frequency detection circuit 42. These components are discussed in further detail below.

The controller PCBA 12 is configured to receive an input voltage of 14 VAC at a frequency of 50 hertz (Hz) from a European power grid or 60 Hz from a North American power grid. The input voltage is received in single phase and can be provided by a 14 V tap of an isolated, low-voltage step-down transformer. The controller PCBA 12 is configured to receive the 14 VAC input voltage via a low-voltage AC input connection such as two pins (not shown) mounted on the controller PCBA 12. The pins can be received by two barrel receptacles (not shown) that can be connected to a power cord of the underwater light. The pins and barrels can have a current rating of 15 A.

Figure 4:
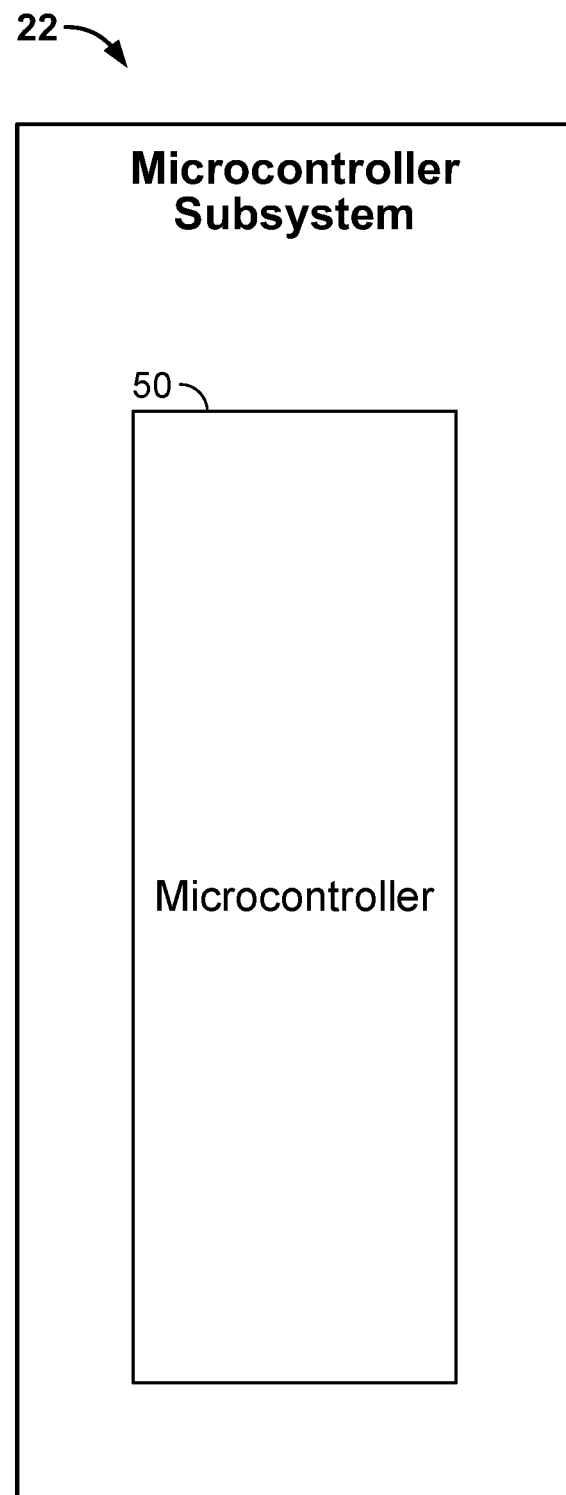
FIG. 4 is a detailed block diagram of the microcontroller subsystem of the controller PCBA of FIG. 2.

FIG. 4 is a detailed block diagram of the microcontroller subsystem 22 of the controller PCBA of FIG. 2. The microcontroller subsystem 22 can include any suitable microcontroller 50 capable of executing firmware for controlling operation of the underwater light. The microcontroller 50 can have a clock speed of 20.97 megahertz (MHz) and can operate within a 1.71 V to 3.6 V range when power is applied by the 3.3 V linear voltage regulator 40. When power is removed, the microcontroller 50 can enter a low power mode such that 3.3 V linear voltage regulator 40 can be required to power the microcontroller 50 for at least 15 seconds.

The microcontroller 50 can control a temperature of the LED PCBA 16 by monitoring signals from at least one of the plurality of 100 kΩ thermistors 70 (e.g., LED Temperature Signals) of the LED PCBA 16. In addition, the microcontroller 50 can also control a temperature of the controller PCBA 12 by monitoring a 100 kΩ thermistor (not shown) of the controller PCBA 12. For example, the underwater light firmware can react when a temperature threshold is exceeded by at least one of the controller PCBA 12 and the LED PCBA 16 by gradually reducing a light output of the LED strings 74 such that the reduced light output is not perceptible to a user.

As discussed below, the PFC controller 34 has a high-temperature fail-safe protection feature that causes the PFC controller 34 to enter the standby mode when the LED PCBA 16 exceeds a temperature threshold (e.g., 95° C.). Specifically, the PFC controller 34 enters the standby mode (thereby turning off the buck current regulators 60) when a voltage compensation (VCOMP) pin is pulled low. The VCOMP pin is pulled low via an n-channel FET that is connected to an open drain pin of a high temperature shutdown circuit 76. The open drain pin of the high temperature shutdown circuit 76 can also be connected to a pin of the microcontroller 50, and the microcontroller 50 can monitor the pin to provide options for additional responses when the LED PCBA 16 exceeds the temperature threshold.

The microcontroller 50 can also control a sequence of the light shows and the colors therein via a hall sensor integrated circuit (IC). The hall sensor IC can be any suitable sensor capable of functioning as an open drain, omnipolar switch wherein the sensor can toggle through light shows and colors of the LED strings 74 with a magnetic field in the same manner as toggling power. The hall sensor IC can be powered by a 3.3 V signal from a pin of the microcontroller 50 such that when a signal on the pin is pulled low, the microcontroller 50 responds by switching to the next light show in a sequence and/or LED string color.

Figure 5:
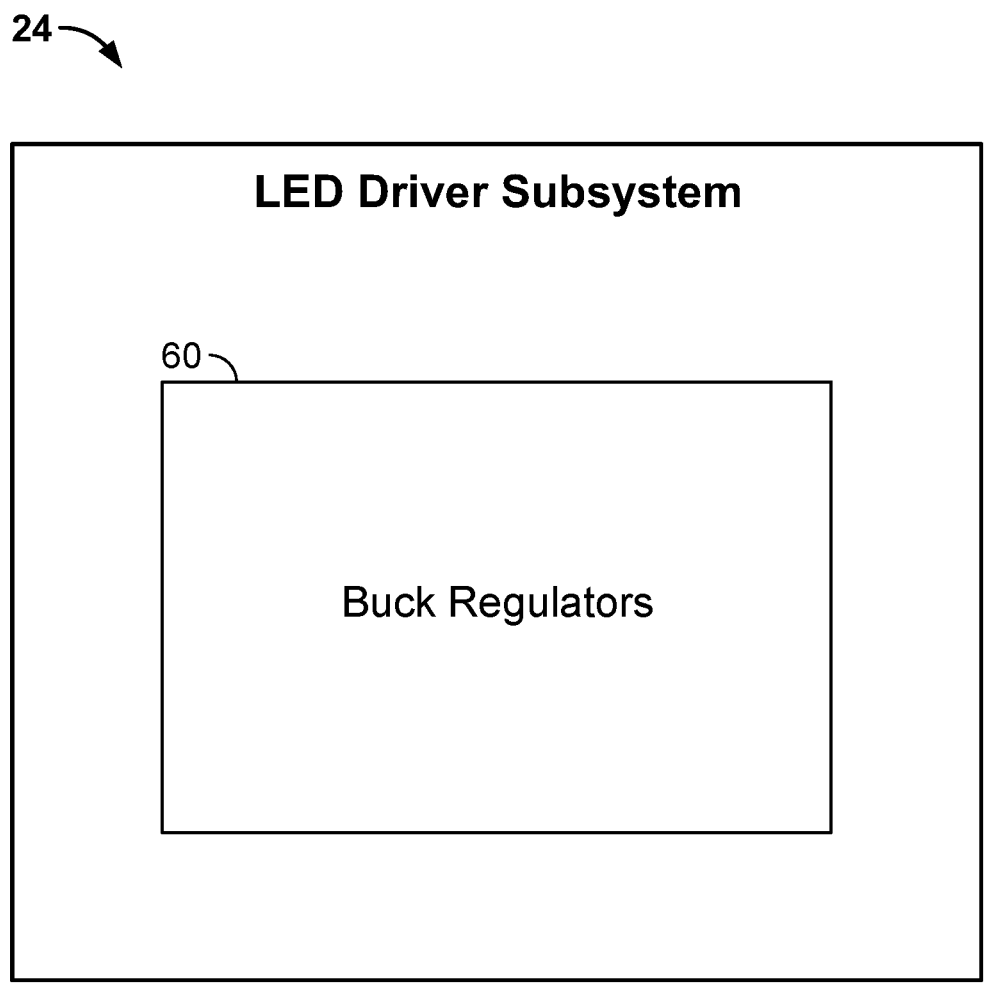
FIG. 5 is a detailed block diagram of the LED driver subsystem of the controller PCBA of FIG. 2.

FIG. 5 is a detailed block diagram of the LED driver subsystem 24 of the controller PCBA of FIG. 2. The LED driver subsystem 24 can include a plurality of 1.5 amp (A) step-down (buck) current regulators 60 wherein each buck current regulator 60 has an integrated high side switching metal-oxide-semiconductor field-effect transistor (MOSFET) to drive a respective LED string 74 (e.g., red, blue, green, and white LED strings).

The input voltage to the buck current regulators 60 is provided by the 28 V output voltage of the PFC controller 34. The input supply voltage range is 4.5 V-42 V. The buck current regulators 60 require a minimum voltage (VIN) of 26 V to start and therefore an adjustable under voltage lockout (UVLO) pin can be set with a resistor divider to the required 26 V input voltage. It is noted that the UVLO protection feature is for device protection and does not contain hysteresis. The buck current regulators 60 can enter low-power mode, thereby removing an input voltage to the LED strings 74, when the input voltage falls to 25 V due to the PFC controller 34 entering the standby mode. The following equations can be used to set the UVLO hysteresis (1) and the start voltage (2):

$$R1 = (V_{HYS}(V_{EN} - (I1 \times R_{ESD})) - I_{HYS} \times R_{ESD} \times V_{START})/I_{HYS} \times V_{EN}; \text{ and} \qquad (1)$$

$$R2 = R1(V_{EN} - (R_{ESD} \times (I1 + I_{HYS})))/(V_{STOP} - V_{EN}) + (I1 + I_{HYS}) \times (R1 + R_{ESD}) \qquad (2)$$

wherein
$V_{HYS} = V_{START} - V_{STOP}$
$R_{ESD} = 10 \text{ k}\Omega$
$I1 = 1 \text{ μA}$
$I_{HYS} = 2.9 \text{ μA}$ A switching frequency of the buck current regulators 60 can be set to approximately 400 kHz wherein a 301 kΩ resistor is connected to a resistor timing pin and ground. The required resistance can be calculated with the following equation:

$$R_{RT}(\text{k}\Omega) = 206033/(f_{SW})^{1.092}((\text{kHz}) \qquad (3)$$

wherein
$f_{SW} = (206033/R_{RT}(\text{k}\Omega))^{(1/1.092)}$

Current provided to the LED strings 74 can be set and controlled by an analog current adjustment pin (IADJ). The IADJ pin is driven by a digital to analog converter (DAC) output from the microcontroller 50. The following equation illustrates the relationship between (a) the voltage applied from the DAC output to the IADJ pin input and (b) the current regulation set point voltage across the sense resistor that is coupled to a current sense (ISENSE) pin:

$$V_{ISENSE} = V_{IADJ}/6 \qquad (4)$$

The following equation illustrates a calculation for the sense resistor value:

$$R_{ISENSE} = V_{ISENSE}/I_{LED} \quad (5)$$

The red LED string can be provided with a maximum current of 0.7 A while the green, royal blue and white LED strings can be provided with a maximum current of 1.0 A.

Each buck current regulator 60 can have separate inputs for analog dimming and pulse width modulation (PWM) dimming and is configured to operate at a user selected fixed frequency. The buck current regulators 60 receive, at respective dimming input pins (PDIM), PWM input signals from the microcontroller 50 that control a brightness level of the LED strings 74 and the moving light shows. The red and blue LED PWM input signals can be left justified and the green and white PWM input signals can be right justified to prevent all four MOSFETs from turning on at the same time and thereby causing a reduction of the VBUS voltage which powers the buck current regulators 60. The signals are not inverted such that the LED strings 74 will be on during the $t_{on}$ portion of the duty cycle.

The PWM frequency can be between 100 Hz and 1 kHz and the signal duty cycle will vary based on color, brightness and the moving light show. The PDIM pin has a 1 μA internal pull-up current source which creates a default on state when the PDIM pin is floating. Accordingly, the PDIM pin has a 10 kΩ pull down resistor to ground to ensure the LED strings 74 are in an off state when they are intended to be turned off. Frequency compensation components can be coupled to the compensation (COMP) pin of each buck current regulator 60 for stabilization. For example, a 0.1 μF capacitor can be coupled from the COMP pin to ground for stabilization. If an application requires a faster response to input voltage transients, then a 0.01 μF capacitor can be used.

In addition, each buck current regulator 60 can also include cycle-by-cycle overcurrent protection and thermal shutdown protection. An overcurrent situation can occur if the sense resistor shorts, or a direct short occurs between the output and ground. If an overcurrent situation occurs, the voltage on the ISENSE pin will fall to 0 V, which, in turn, causes the voltage on the COMP pin to rise. When the voltage on the COMP pin reaches approximately 2.2 V, the voltage is internally clamped and functions as a MOSFET current limit. The internal MOSFET current can be limited to 6 A. If the overcurrent situation continues, a temperature of a junction of the buck current regulator will rise. The thermal shutdown circuit protects the buck current regulators 60 by causing the buck current regulators 60 to enter an off state if the temperature reaches 165° C. The buck current regulators 60 can enter the on state after the temperature falls below 20° C.

Figure 6:
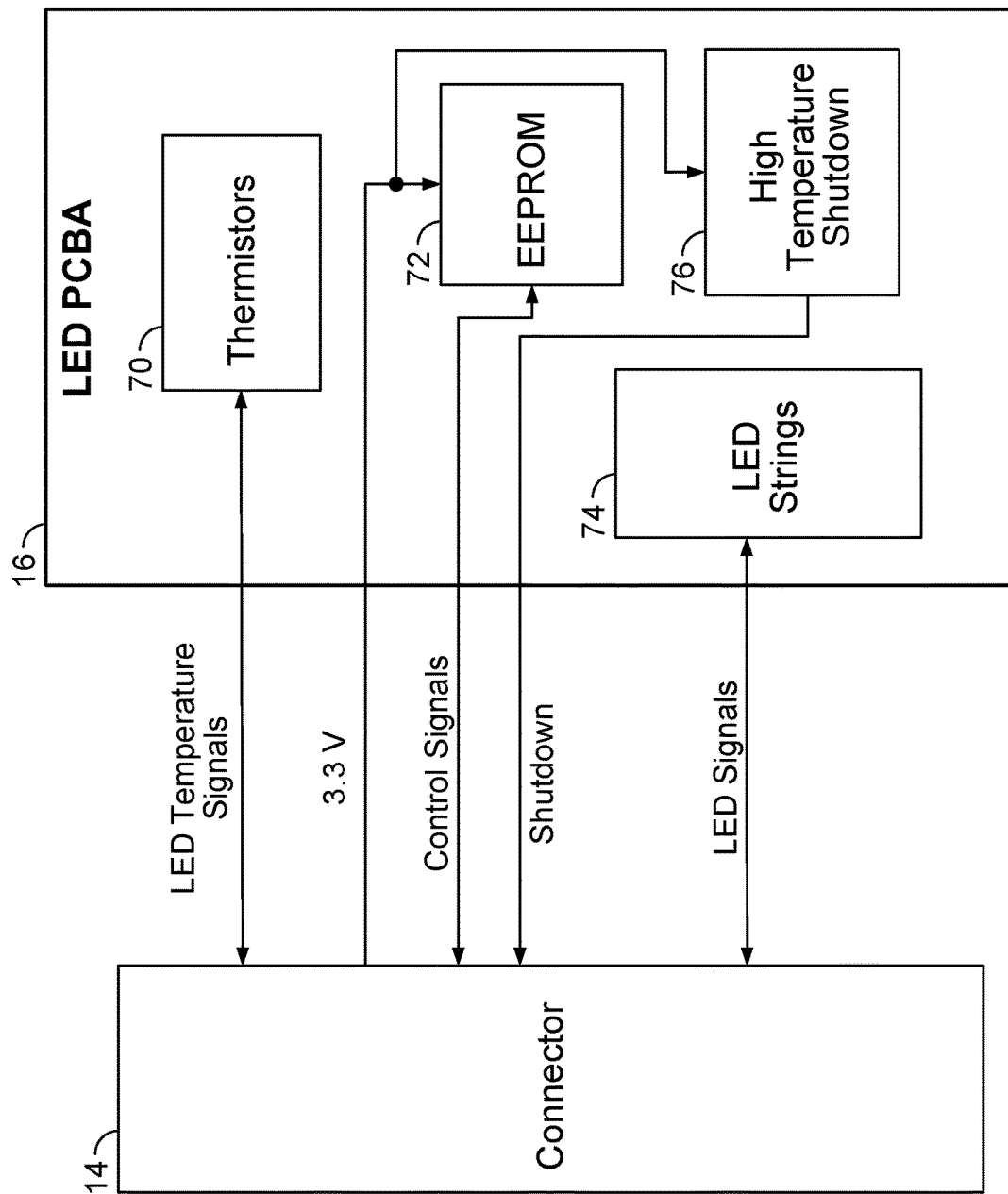
FIG. 6 is a detailed block diagram of the LED PCBA of FIG. 1.

FIG. 6 is a detailed block diagram of the LED PCBA 16 of FIG. 1. The LED PCBA 16 can include a plurality of thermistors 70; the high temperature shutdown circuit 76; an electrically erasable programmable read-only memory (EE-PROM) 72; and the LED strings 74. Specifically, the LED PCBA 16 can include three 100 k Ohm (Ω) thermistors that the firmware will use to monitor a temperature of the LED PCBA 16. If the firmware detects that a temperature of the LED PCBA 16 exceeds a temperature threshold, a control loop algorithm can adjust an intensity of the LED strings 74 to maintain a maximum LED PCBA 16 temperature of 90° C. The LEDs of the LED strings 74 can include red, blue, green and white LEDs. The LED PCBA 16 can connect to the controller PCBA 12 via the SMT connector 46. The pins of the connector can be gold plated and have a power rating of 405 VAC or 572 VDC and current rating of 5.2 A. The components are discussed in further detail below.

Figure 7:
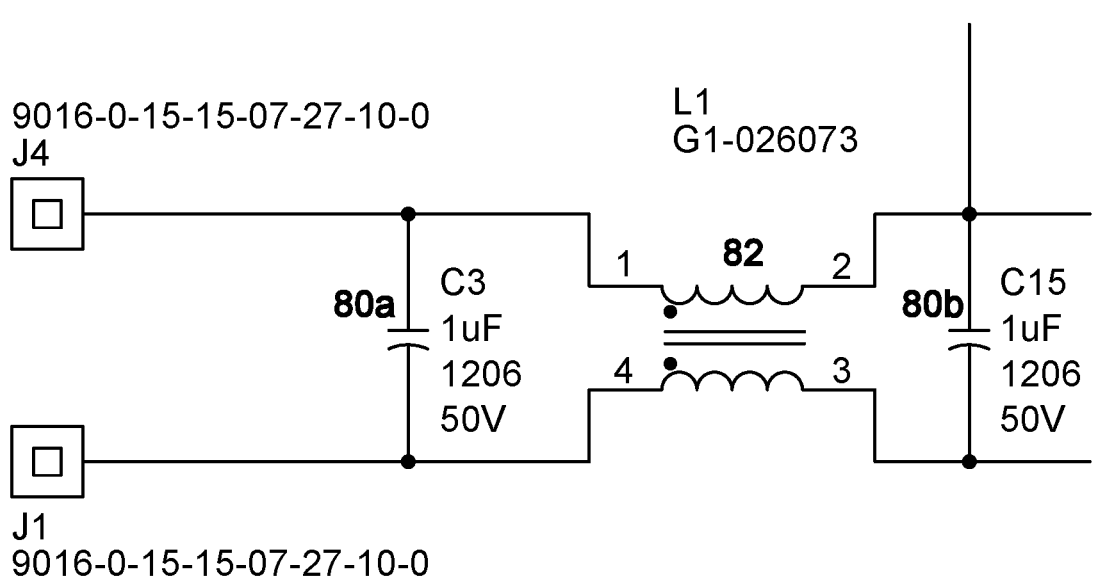
FIG. 7 is a circuit diagram of an electromagnetic interference (EMI) filter of the controller PCBA power subsystem of FIG. 3.

FIG. 7 is a circuit diagram of the EMI filter 30 of the controller PCBA power subsystem 20 of FIG. 3. The EMI filter 30 includes capacitors 80a and 80b and a common mode choke 82. The capacitors 80a and 80b can be two line to neutral 1.0 mircofarad (μF) ceramic capacitors and comply with electromagnetic compatibility (EMC) class B regulations for residential use. As mentioned above, the input voltage to the controller PCBA 12 is received in single phase and can be provided by the 14 V tap of the isolated low voltage step down transformer. The isolated low voltage step down transformer protects the controller PCBA 12 from power surges.

Figure 8:
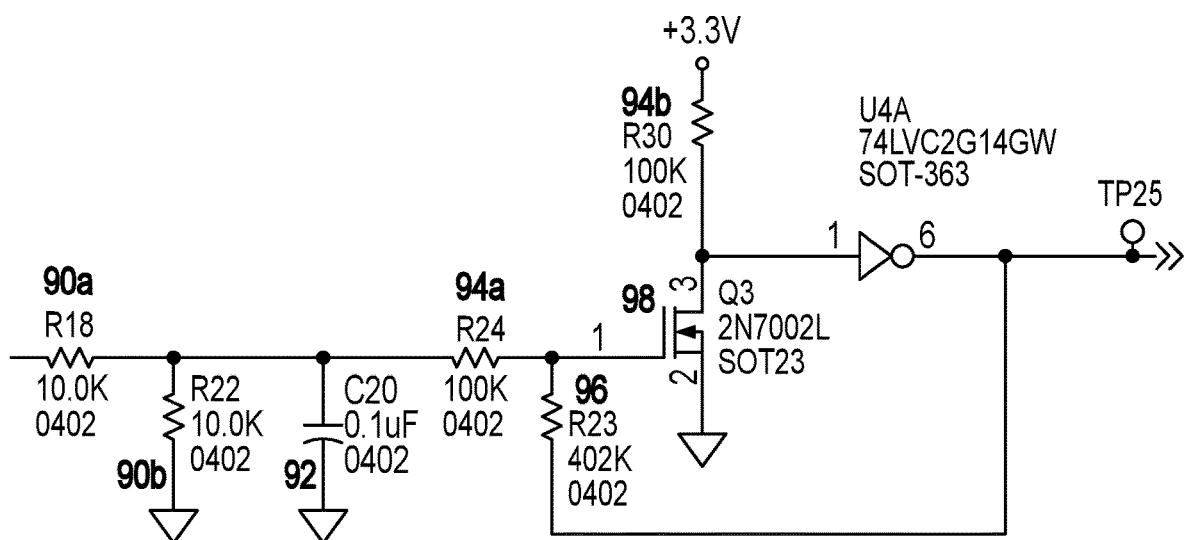
FIG. 8 is a circuit diagram of a line frequency detector of the controller PCBA power subsystem of FIG. 3.

FIG. 8 is a circuit diagram of the line frequency detection circuit 42 of the controller PCBA power subsystem 20 of FIG. 3. The line frequency detection circuit 42 includes 10 resistors 90a and 90b; a 0.1 μF capacitor 92; 100 kΩ resistors 94a and 94b; a 402 kΩ resistor 96; and an n-channel MOSFET 98. The line frequency detection circuit 42 receives the 14 VAC input voltage before it is rectified. The 50 Hz or 60 Hz input signal is reduced by half and controls the gate of the n-channel MOSFET 98. The drain of the MOSFET 98 is tied to the 3.3 V linear voltage regulator 40 via the 100 kΩ resistor 94b (i.e., pull up resistor 94b). The drain voltage is inverted to match a phase of the gate voltage and is received by the microcontroller 40 as a digital input signal. The microcontroller 50 can use the digital input signal to determine an amount of time that the input voltage has been removed and a timing of light shows by the underwater light.

Figure 9:
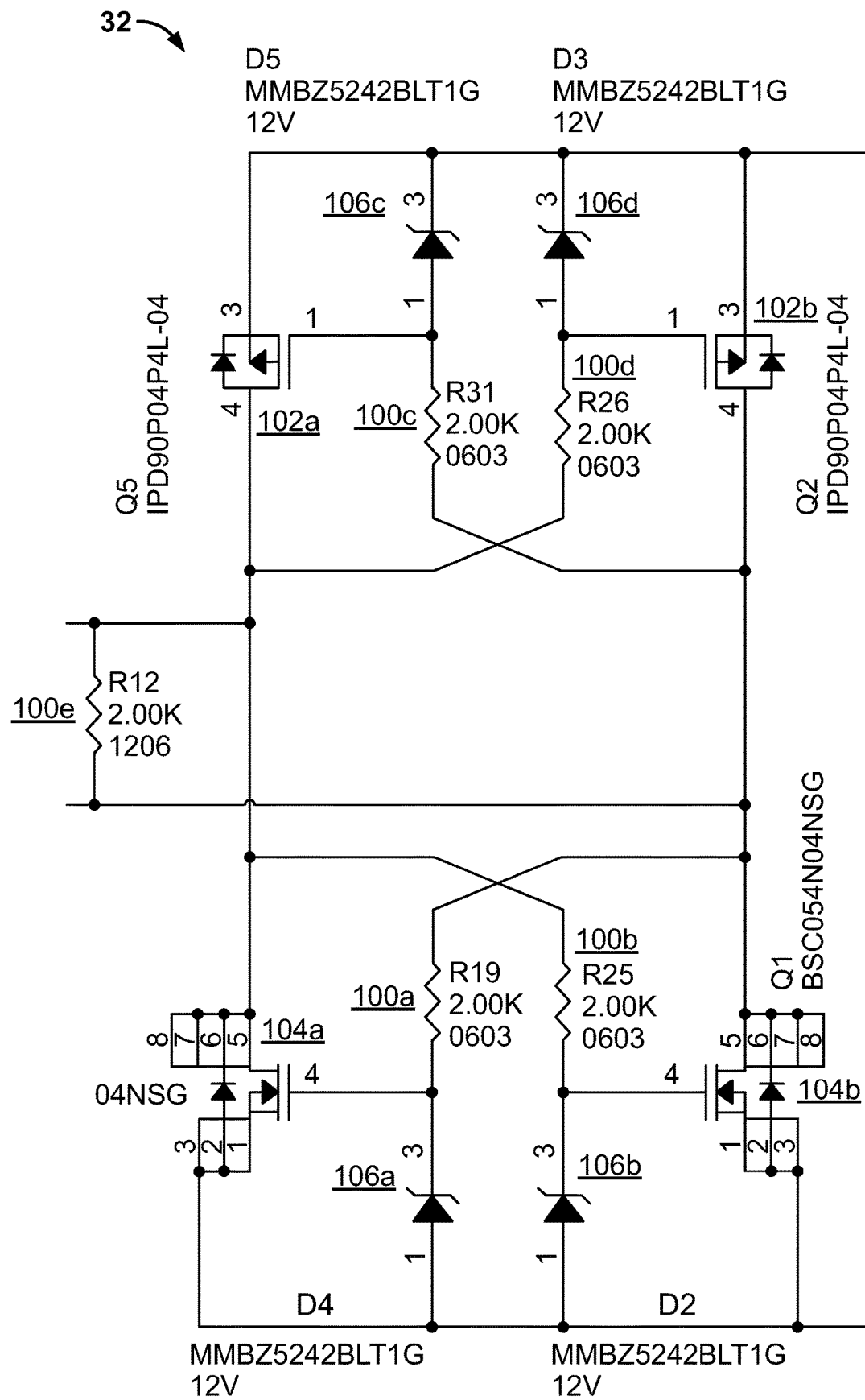
FIG. 9 is a circuit diagram of a bridge rectifier of the controller PCBA power subsystem of FIG. 3.
Figure 10:
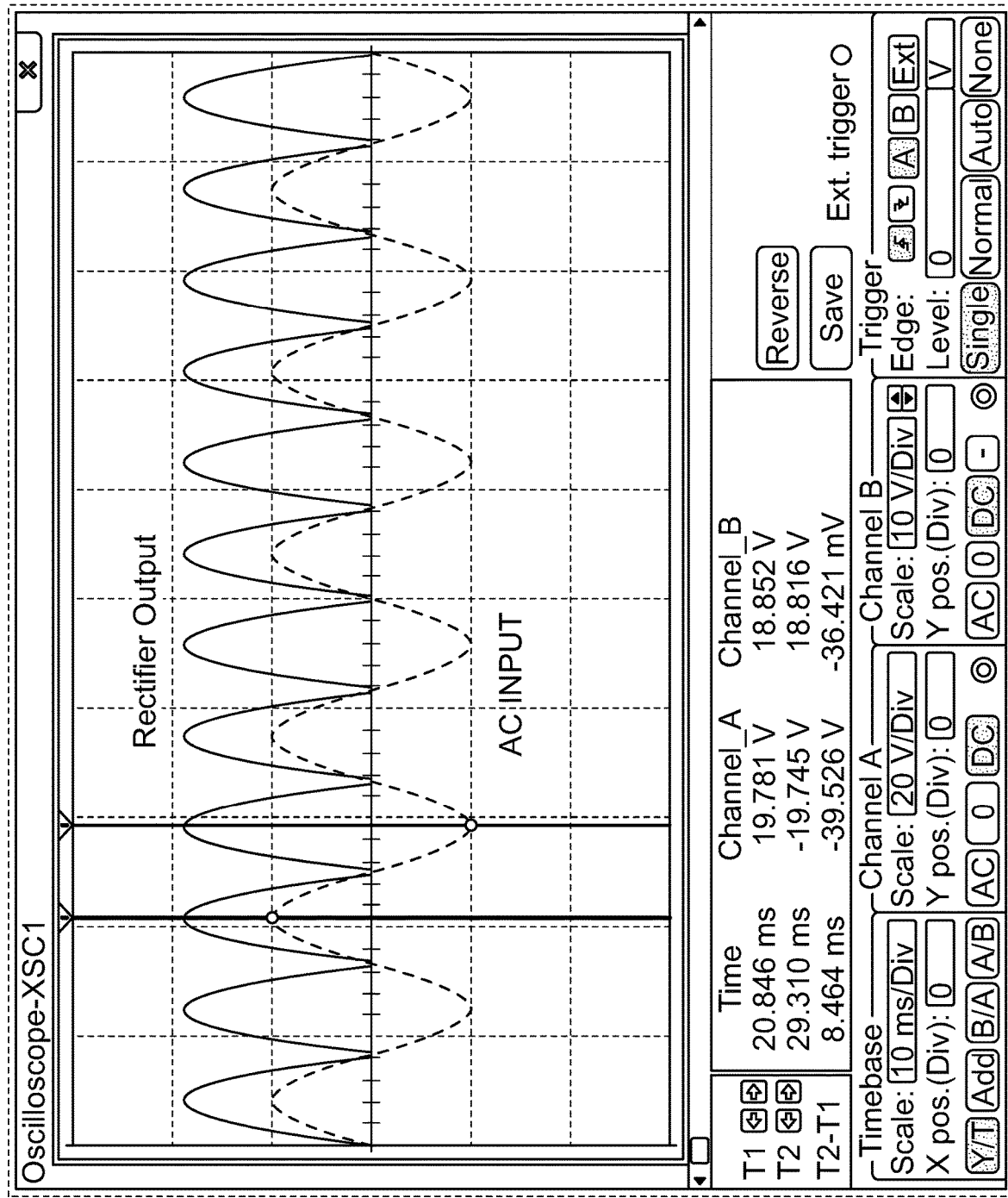
FIG. 10 is an oscillogram illustrating an output of the bridge rectifier of FIG. 9.

FIG. 9 is a circuit diagram of the bridge rectifier circuit 32 of the controller PCBA power subsystem 20 of FIG. 3. The bridge rectifier circuit 32 includes 2 kΩ resistors 100a-100e, p-channel MOSFETS 102a and 102b, n-channel MOSFETS 104a and 104b and diodes 106a-106d. The bridge rectifier circuit 32 produces a rectified voltage signal. At the start of an AC cycle, the diodes 106a-106d conduct current until the voltage meets a threshold to turn on the p-channel MOSFETS 102a and 102b and n-channel MOSFETS 104a and 104b. Specifically, each half-cycle of the alternating input voltage turns on an alternating pair of the p-channel MOSFETS 102a and 102b and the n-channel MOSFETS 104a and 104b to produce a pulsating 120 Hz DC voltage signal. FIG. 10 is an oscillogram illustrating an output of the bridge rectifier circuit 32 of FIG. 9.

Figure 11:
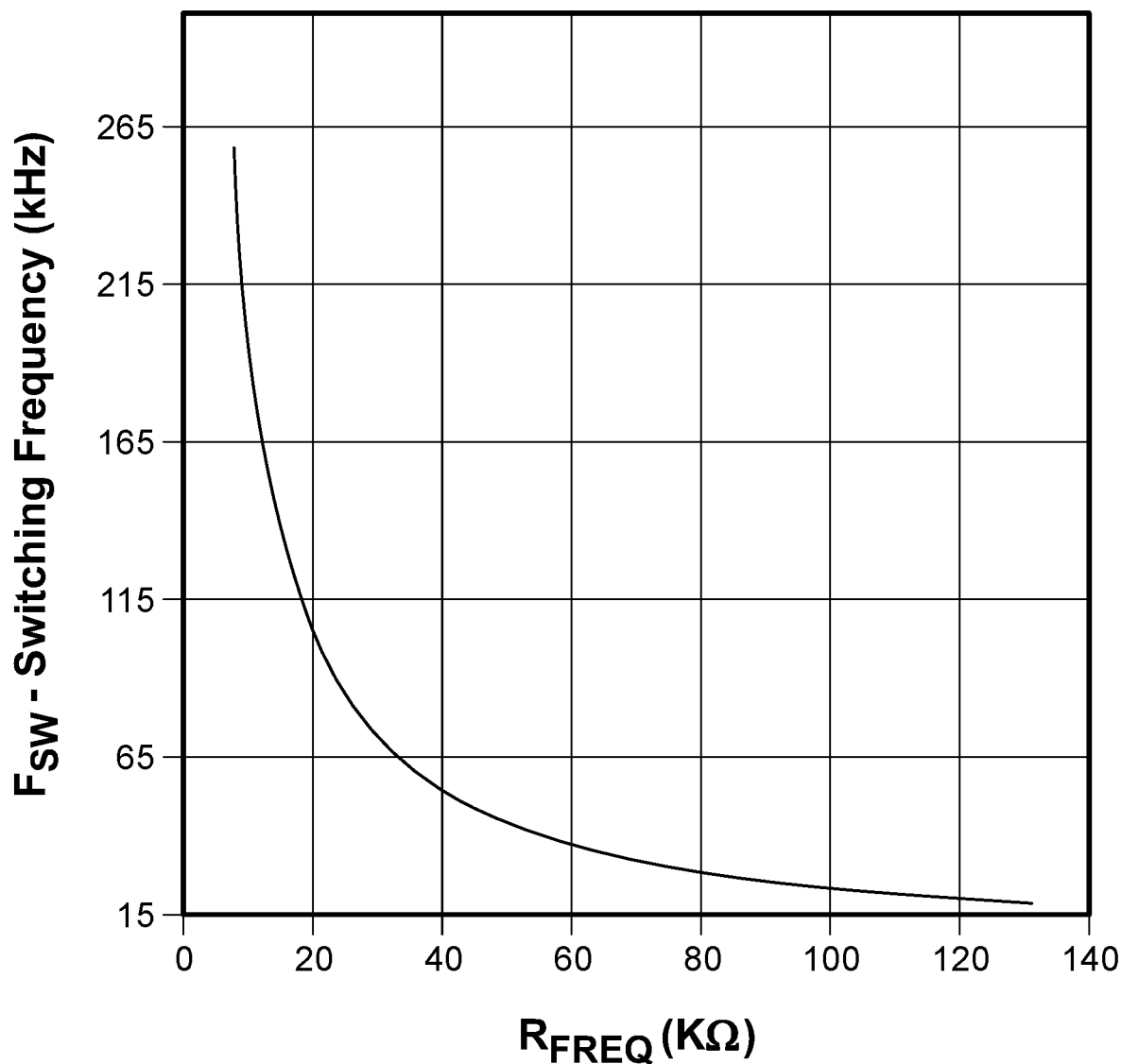
FIG. 11 is a graph illustrating a switching frequency of an oscillator of a power correction controller of the controller PCBA power subsystem of FIG. 3.

As shown in FIG. 3, the PFC controller 34 receives the rectified voltage signal from the bridge rectifier circuit 32 and can be any suitable PFC controller configured to achieve high power factor, low current distortion, and voltage regulation of boost pre-regulators. For example, the PFC controller 34 can be an active PFC controller that operates under continuous conduction mode (CCM) and at a programmable fixed frequency. For example, FIG. 11 is a graph illustrating a switching frequency of an oscillator of the PFC controller 34 set at 105 kHz.

The rectified voltage signal (PFC controller 34 input voltage) can be monitored by the microcontroller 50 wherein the microcontroller 50 could reduce a lumen output of the LED strings 74 if a voltage condition regarding the 14 VAC input of the underwater light occurs. For example, a voltage condition could occur when the PFC controller 34 input voltage falls below 9.0 V because any one of an abnormally low line voltage to the transformer input, the transformer output being wired to the incorrect tap, the transformer being overloaded or the transformer being improperly wired. The lumen output of the LED strings 74 can be reduced when the PFC controller 34 input voltage falls below 9.0 V to prevent high, and potentially dangerous, input currents into the underwater light as the PFC controller 34 attempts to compensate for the lower voltage with a higher current. The rectified voltage signal is received by the microcontroller 50 before the signal is boosted to 28 V by the PFC controller 34. Specifically, the rectified voltage signal passes through a blocking diode and filter before being reduced by a resistor divider circuit and received by the microcontroller 50. The PFC controller 34 output voltage is set with a resistor divider to the voltage sense (VSENSE) pin. The resistor values can be selected by the following equation:

$$R_{FB2}=(V_{REF}R_{FB1})/(V_{OUT}-V_{REF}) \text{ wherein } V_{REF}=5 \text{ V}. \quad (6)$$

The PFC controller 34 is powered by the VBUS, wherein the maximum input voltage for the PFC controller 34 is 22 V and the VBUS provides a 28 V output signal. Therefore, the voltage common collector (VCC) of the PFC controller 34 is protected with a bipolar junction transistor (BJT) wherein the base is clamped to 15.7 V (i.e., the VCC voltage to the regulator cannot exceed 15.7 V). The PFC controller 34 can use two voltage control loops including an inner current loop and an outer loop. The inner control loop can include an external boost inductor and a current sensing resistor in addition to an internal current averaging amplifier and a PWM comparator. The inner control loop shapes an average input current to match an input sinusoidal voltage thereby placing the input current in phase with the input voltage. External compensation for the inner control loop can be applied to the PFC controller 34 current compensation (ICOMP) pin such that the output of the current averaging amplifier is coupled to the ICOMP pin. The outer control loop can include an external resistor divider sensing stage, an internal voltage error amplifier and a non-linear gain generator. An internal error amplifier and a 5 V reference can be used to provide the outer loop to control the output voltage. External compensation for the outer loop can be applied by the PFC controller 34 voltage compensation (VCOMP) pin.

The PFC controller 34 can include several fault protection features including, but not limited to, a VCC under voltage lockout (UVLO); an output overvoltage protection (OVP); an open loop protection (OLP); current sense (ISENSE) open-pin protection (ISOP); an ICOMP open-pin protection (ICOMPP); and a high temperature fail-safe.

The UVLO maintains the PFC controller 34 in an off state until the VCC voltage exceeds an 11.5 V turn on threshold. The PFC controller 34 shuts down when the VCC voltage falls below a 9.5 V threshold. The typical hysteresis for the UVLO is 1.7 V. The PFC controller 34 provides two levels of output OVP. For example, the PFC controller 34 enters a standby mode when the output voltage on the VSENSE pin exceeds 107% of the 5 V reference voltage such that the VCOMP pin is rapidly discharged through an internal 4 kΩ resistor to ground. If the voltage on the VSENSE pin exceeds 109% of the reference voltage, the PFC controller 34 gate is disabled (thereby turning off the MOSFET) until the voltage on the VSENSE pin drops below 102% of the 5 V reference voltage.

Under the OLP protection feature, the PFC controller 34 would also enter the standby mode (which would stop the PWM switching), if output voltage feedback components to the VSENSE pin were to fail (e.g., the voltage on the VSENSE pin falls below 0.82 V) or the components are not installed. The ISOP protection feature causes the PFC controller 34 to enter the standby mode (which would stop the PWM switching), if current feedback components to the ISENSE pin were to fail or not be installed. Specifically, if the components were to fail or not be installed, an internal pull up source would drive the voltage on the ISENSE pin above 0.085 V such that the PFC controller 34 would enter the standby mode. The ICOMPP protection feature also causes the PFC controller 34 to enter the standby mode. Specifically, when the voltage on the ICOMP pin falls below 0.2 V (e.g., the pin shorts to ground), the PWM switching is halted and the PFC controller 34 enters the standby mode.

The high-temperature, fail-safe protection feature causes the PFC controller 34 to enter the standby mode when LED PCBA 16 exceeds a temperature threshold (e.g., 95° C.). The PFC controller 34 enters the standby mode when the VCOMP pin is pulled low via an n-channel FET that is connected to an open drain pin of the high temperature shutdown circuit 76. The PWM switching is halted and the VBUS voltage falls from the 28 V boosted voltage to a peak voltage of the 120 Hz rectified voltage (~20 V) when the PFC controller 34 is in the standby mode. The VBUS voltage can power the current buck regulators 60. When the VBUS voltage falls from the 28 V boosted voltage, the VBUS voltage falls below the UVLO threshold thereby causing the current buck regulators 60 to turn off which in turn causes the LED strings 74 to turn off.

The VBUS voltage can also be monitored by the microcontroller 50 via the VBUS voltage monitor 38. For example, the microcontroller 50 can assert a low signal on a pin coupled to the VBUS voltage monitor 38 output when the microcontroller 50 detects a voltage drop of the VBUS voltage from the 28 V boosted voltage. This in turn causes the VCOMP pin to be pulled low. Accordingly, the current buck regulators 60 will turn off which in turn causes the LED strings 74 to turn off.

The 3.3 V linear voltage regulator 40 regulates the bridge rectifier circuit 32 rectified voltage output and can be any suitable 3.3 V linear voltage regulator. When power to the underwater light is applied, the input to the 3.3 V linear voltage regulator 40 is provided by the input rectified voltage via a blocking diode. When power is removed, the 3.3 V linear voltage regulator 40 can remained powered for 15 seconds via a charge stored on a 220 μF capacitor coupled to its input. The output of the 3.3 V linear voltage regulator 40 provides 3.3 V to the microcontroller 50, dual inverters, a 60 Hz line frequency signal to the microcontroller 50, a JTAG programming header, the EEPROM 72 clock and data lines, and a RESET pin of the microcontroller 40.

Figure 12:
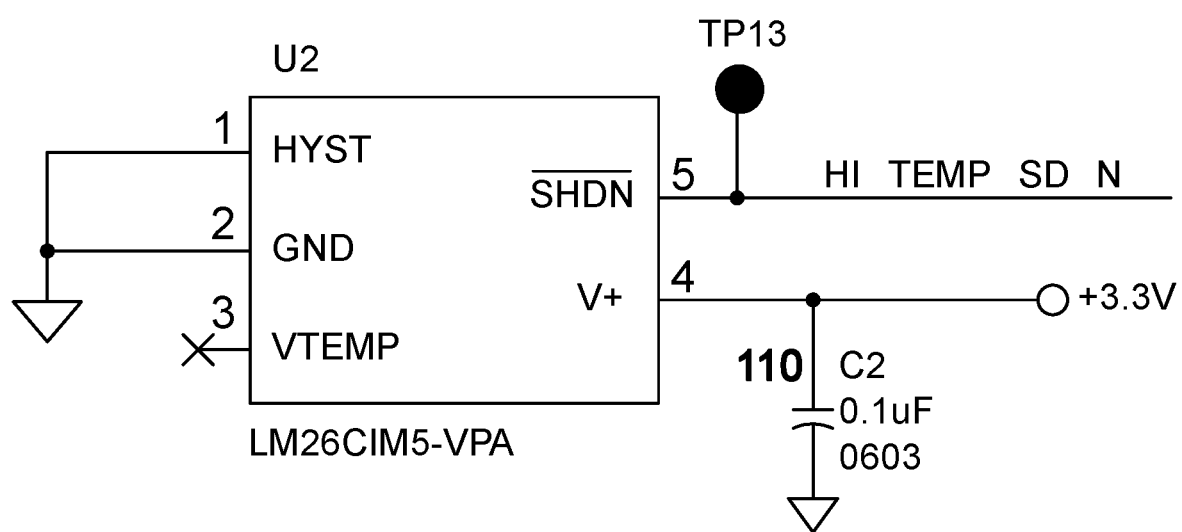
FIG. 12 is a circuit diagram of a high temperature shutdown circuit of the LED PCBA of FIG. 6.

FIG. 12 is a circuit diagram of the high temperature shutdown circuit 76 of the LED PCBA 16 of FIG. 6. The high-temperature shutdown circuit 76 can include a 0.1 μF capacitor connected in series with a 3.3 V input voltage signal which are collectively coupled to the V+ pin of the high temperature shutdown circuit 76. The high temperature shutdown circuit 76 is a fail-safe that is implemented if the firmware is incapable of accurately monitoring and regulating the temperature of the LED PCBA 16. As mentioned above, the high temperature shutdown circuit 76 causes the PFC controller 34 to enter the standby mode when LED PCBA 16 exceeds a temperature threshold (e.g., 95° C.). The PFC controller 34 enters the standby mode when the VCOMP pin is pulled low via an n-channel FET that is connected to an open drain pin of the high temperature shutdown circuit 76. When the PFC controller 34 enters the standby mode, the buck current regulators 60 enter an off state causing the LED strings 74 to be turned off. The high temperature shutdown circuit 76 can be set to have a 10° C. hysteresis.

Figure 13:
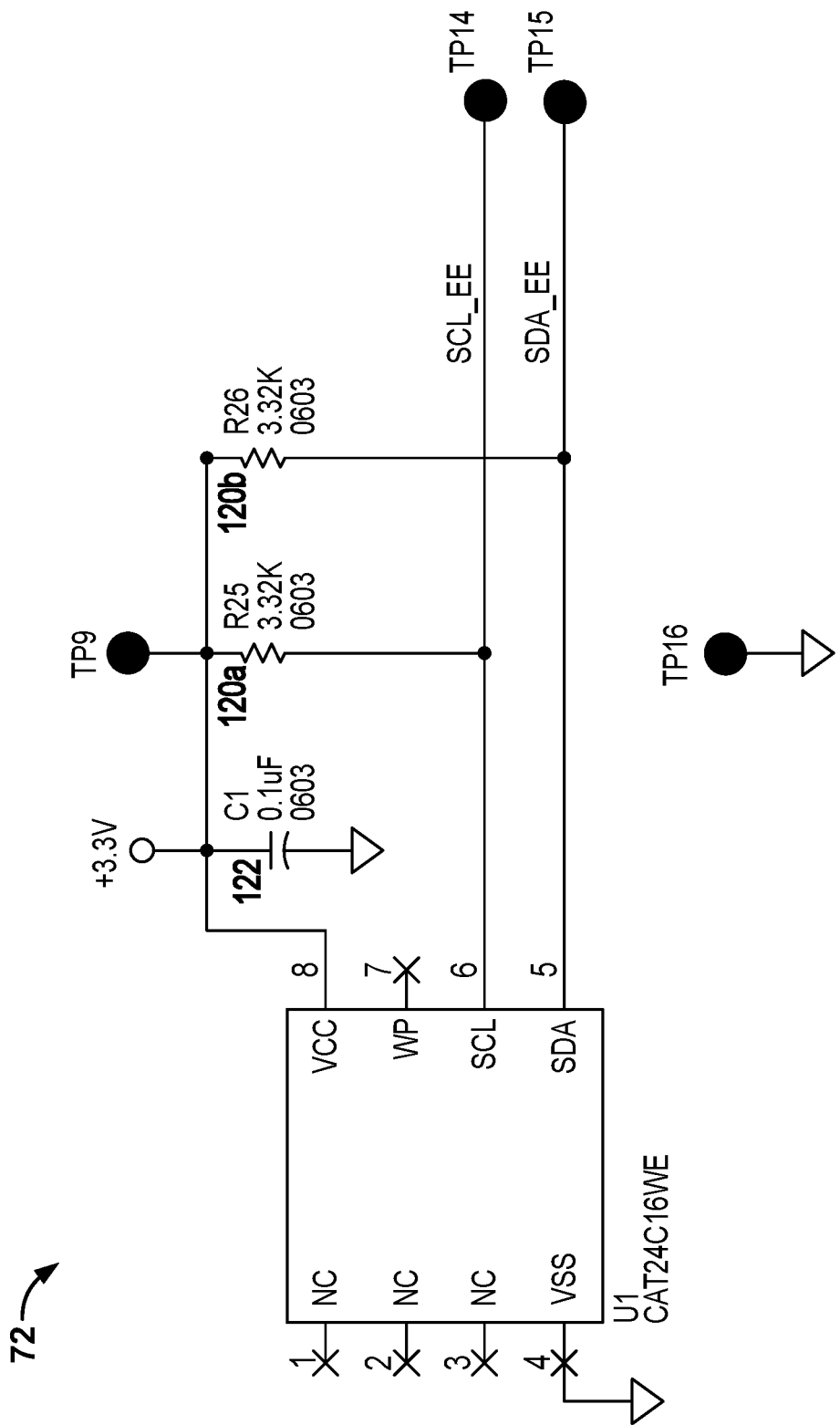
FIG. 13 is a circuit diagram of an electrically erasable programmable read-only memory (EEPROM) of the LED PCBA of FIG. 6.

FIG. 13 is a circuit diagram of the EEPROM 72 of the LED PCBA of FIG. 6. The EEPROM 72 can include 3.32 kΩ resistors 120a and 120b and a 0.1 μF capacitor 122 coupled to its output pins. For example, the 0.1 μF capacitor 122 can be connected in series with a 3.3 V input voltage signal coupled to the VCC pin of the EEPROM 72. The color tables for the underwater light can be programmed into the EEPROM 72 on the LED PCBA 16 as opposed to being programmed into the microcontroller 50 on the controller PCBA 12. Accordingly, a predetermined set of color table values can be coded into the EEPROM 72. Alternatively, an automated test fixture can measure and then program color table values into the EEPROM 72 that are specific and unique to each LED PCBA 16 based on a lumen output of the LED strings 74.

Having thus described the present disclosure in detail, it is to be understood that the foregoing description is not intended to limit the spirit or scope thereof.

What is claimed is:

1. An underwater light, comprising:
    a controller printed circuit board assembly (PCBA), including:
        a microcontroller subsystem including a microcontroller,
        a light-emitting diode (LED) driver subsystem in communication with the microcontroller subsystem, the LED driver subsystem receiving pulse-width modulated (PWM) signals from the microcontroller subsystem and being controlled by the PWM signals, and
        a power subsystem providing power to the microcontroller subsystem and the LED driver subsystem;
    an LED printed circuit board assembly (PCBA) in communication with the controller PCBA, the LED PCBA including a plurality of LED strings in communication with and driven by the LED driver subsystem; and
    a connector connecting the controller PCBA to the LED PCBA, the connector establishing bidirectional communication between the controller PCBA and the LED PCBA and communicating LED drive signals between the LED driver subsystem and the plurality of LED strings.

2. The underwater light of claim 1, wherein the controller PCBA further includes a thermistor in communication with the microcontroller subsystem, the thermistor measuring a temperature of the controller PCBA and communicating a controller PCBA temperature signal to the microcontroller subsystem, the microcontroller subsystem controlling operation of the LED driver subsystem in response to the controller PCBA temperature signal.

3. The underwater light of claim 2, wherein the microcontroller subsystem controls operation of the LED driver subsystem to reduce a light output of the plurality of LED strings when the controller PCBA temperature signal exceeds a predetermined temperature threshold.

4. The underwater light of claim 1, wherein the power subsystem includes a bridge rectifier providing a rectified voltage signal to the LED driver subsystem.

5. The underwater light of claim 1, wherein the LED driver subsystem includes a plurality of buck regulators, each buck regulator being associated with a respective LED string of the plurality of LED strings.

6. The underwater light of claim 1, wherein the plurality of LED strings include red, blue, green and white LEDs.

7. The underwater light of claim 1, wherein the LED PCBA is encapsulated in an optically-transparent potting compound and is replaceable by removing a rear housing of the underwater light.

8. The underwater light of claim 1, wherein the LED PCBA further includes a plurality of thermistors in communication with the microcontroller subsystem, the plurality of thermistors measuring temperatures of the plurality of LED strings and communicating a plurality of LED temperature signals to the microcontroller subsystem via the connector, the microcontroller subsystem controlling operation of the LED driver subsystem in response to the plurality of LED temperature signals.

9. The underwater light of claim 8, wherein the microcontroller subsystem controls the operation of the LED driver subsystem to reduce a light output of the plurality of LED strings when the plurality of LED temperature signals exceed a predetermined temperature threshold.

10. The underwater light of claim 1, wherein the LED PCBA further includes a programmable memory in communication with the microcontroller subsystem and powered by the power subsystem, the programmable memory storing a plurality of color table values for controlling colors of light emitted by the plurality of LED strings, the microcontroller subsystem reading the plurality of color table values from the programmable memory and controlling the LED driver subsystem in response to the plurality of color table values.

11. The underwater light of claim 1, wherein the LED PCBA further includes a high-temperature shutdown circuit in communication with the microcontroller subsystem and powered by the power subsystem, the high-temperature shutdown circuit issuing a shutdown signal to the microcontroller subsystem via the connector in response to a temperature threshold of the LED PCBA being exceeded.

12. The underwater light of claim 1, wherein the connector is a surface mount connector.

13. An underwater light, comprising:
    a controller printed circuit board assembly (PCBA) including a microcontroller, the microcontroller generating pulse-width modulated (PWM) signals;
    an LED printed circuit board assembly (PCBA) in communication with the controller PCBA, the LED PCBA being replaceable and including a plurality of LED strings in communication with and driven by the microcontroller; and
    a connector connecting the controller PCBA to the LED PCBA, the connector establishing bidirectional communication between the controller PCBA and the LED PCBA and communicating the PWM signals between the microcontroller and the plurality of LED strings.

14. The underwater light of claim 13, wherein the controller PCBA further includes a thermistor in communication with the microcontroller, the thermistor measuring a temperature of the controller PCBA and communicating a controller PCBA temperature signal to the microcontroller, the microcontroller reducing a light output of the plurality of LED strings when the controller PCBA temperature signal exceeds a predetermined threshold.

15. The underwater light of claim 13, further including a plurality of buck regulators, each buck regulator being associated with a respective LED string of the plurality of LED strings.

16. The underwater light of claim 13, wherein LEDs of the plurality of LED strings include red, blue, green and white LEDs.

17. The underwater light of claim 13, wherein the LED PCBA is encapsulated in an optically-transparent potting compound and is replaceable by removing a rear housing of the underwater light.

18. The underwater light of claim 13, wherein the LED PCBA further includes a plurality of thermistors in communication with the microcontroller, the plurality of thermistors measuring temperatures of the plurality of LED strings and communicating a plurality of LED temperature signals to the microcontroller via the connector, the microcontroller reducing, based on the communicated plurality of LED temperature signals, a light output of the plurality of LED strings when the plurality of LED temperature signals exceed a predetermined threshold.

19. The underwater light of claim 13, wherein the LED PCBA further includes a memory in communication with the microcontroller, the memory storing a plurality of color table values for controlling colors of light emitted by the plurality of LED strings, the microcontroller controlling the plurality of LED strings based on the plurality of color table values read from the memory.

20. The underwater light of claim 13, wherein the LED PCBA further includes a shutdown circuit in communication with the microcontroller, the shutdown circuit issuing a shutdown signal to the microcontroller via the connector in response to a threshold of the LED PCBA being exceeded.

* * * * *